(12) United States Patent
Hong (10) Patent No.: US 12,202,334 B2
(45) Date of Patent: Jan. 21, 2025

(54) DEVICE FOR CONTROLLING VEHICLE AND METHOD FOR OUTPUTTING PLATOONING INFORMATION THEREOF

(71) Applicants: HYUNDAI MOTOR COMPANY, Seoul (KR); KIA CORPORATION, Seoul (KR)

(72) Inventor: Jeong Ki Hong, Seongnam-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 364 days.

(21) Appl. No.: 17/376,989

(22) Filed: Jul. 15, 2021

(65) Prior Publication Data

US 2022/0161656 A1    May 26, 2022

(30) Foreign Application Priority Data

Nov. 25, 2020 (KR) .................. 10-2020-0160397

(51) Int. Cl.
| | |
|---|---|
| *B60K 35/00* | (2024.01) |
| *B60K 35/28* | (2024.01) |
| *B60K 35/29* | (2024.01) |
| *G05D 1/00* | (2024.01) |
| *G08G 1/00* | (2006.01) |

(52) U.S. Cl.
CPC .......... *B60K 35/00* (2013.01); *G05D 1/0291* (2013.01); *G08G 1/22* (2013.01); *B60K 35/28* (2024.01); *B60K 35/29* (2024.01); *B60K 2360/176* (2024.01); *B60K 2360/1868* (2024.01); *B60K 2360/1876* (2024.01)

(58) Field of Classification Search
None
See application file for complete search history.

(56) References Cited

U.S. PATENT DOCUMENTS

| | | | |
|---|---|---|---|
| 2015/0043782 A1* | 2/2015 | Lucas | G06V 40/10 382/104 |
| 2015/0325120 A1* | 11/2015 | Cho | G08G 1/0962 348/149 |
| 2017/0158133 A1* | 6/2017 | Chundrlik, Jr. | B60R 1/29 |
| 2020/0005650 A1* | 1/2020 | Park | H04W 4/023 |
| 2020/0382923 A1* | 12/2020 | Khan | H04N 5/91 |
| 2021/0269029 A1* | 9/2021 | Fendt | B60W 60/001 |

* cited by examiner

*Primary Examiner* — Navid Z. Mehdizadeh
*Assistant Examiner* — Sarah A. Mueller
(74) *Attorney, Agent, or Firm* — Morgan, Lewis & Bockius LLP (57) ABSTRACT

A device for controlling a vehicle and a method for outputting platooning information are provided. The device includes a display, a communication device, and a processor connected to the display and the communication device, and the processor is configured to receive information on an image of a region ahead and platooning state information from a leading vehicle through the communication device during platooning, synchronize the information on the image of the region ahead with a vehicle location when a platooning state is a stable state based on the platooning state information, and output the synchronized information on the image of the region ahead on the display.

14 Claims, 5 Drawing Sheets

DEVICE FOR CONTROLLING VEHICLE AND METHOD FOR OUTPUTTING PLATOONING INFORMATION THEREOF

CROSS-REFERENCE TO RELATED APPLICATION

This application claims the benefit of priority to Korean Patent Application No. 10-2020-0160397, filed on Nov. 25, 2020, the entire contents of which are incorporated herein by reference.

TECHNICAL FIELD

The present disclosure relates to a device for controlling a vehicle and a method for outputting platooning information thereof.

BACKGROUND

Platooning refers to one leading vehicle LV and at least one following vehicle FV forming a platoon (a group) to travel. During the platooning, the following vehicle travels while maintaining a certain spacing from a front vehicle using sensing technologies such as a radar, a camera, and the like. Such platooning has an effect of improving fuel economy by reducing air resistance because of a travel characteristic of following the leading vehicle.

When an inter-vehicle distance is reduced to reduce the air resistance during the platooning, a front view of the following vehicle is obstructed by the front vehicle. Accordingly, a driver of the following vehicle is frustrated because the front view of the following vehicle is blocked because of the small inter-vehicle distance from the front vehicle, and there is an inconvenience that a behavior of the vehicle is not able to be predicted. Accordingly, when the leading vehicle records an image of a region ahead and transmits the image to the following vehicle, the following vehicle receives the image of the region ahead and outputs the image on a display so as to be identified by the driver. In this case, the driver of the following vehicle should predict the behavior of the following vehicle only with the image of the region ahead displayed on a screen of the display. However, because a leading vehicle location at a time point of capturing the image of the region ahead and a following vehicle location at a time point of displaying the image of the region ahead are different, the driver may feel cognitive dissonance caused by a difference between a predicted behavior of the following vehicle and an actual behavior of the following vehicle. For example, a time point at which an image of a region ahead including a gradient and/or a bump is displayed on the screen of the display of the vehicle and a time point at which the vehicle actually passes the gradient and/or the bump are different, so that the driver may feel the cognitive dissonance.

SUMMARY

An aspect of the present disclosure provides a device for controlling a vehicle and a method for outputting platooning information thereof that receive an image of a region ahead provided from a leading vehicle during platooning and display the image of the region ahead in synchronization with a vehicle location to solve inconvenience that a user of a following vehicle feels cognitive dissonance because a capturing location of the image of the region ahead transmitted from the leading vehicle and a vehicle location at a time point of displaying the image of the region ahead by the following vehicle do not match.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for controlling a vehicle includes a display, a communication device, and a processor connected to the display and the communication device, and the processor receives information on an image of a region ahead and platooning state information from a leading vehicle through the communication device during platooning, synchronizes the information on the image of the region ahead with a vehicle location when it is identified that a platooning state is a stable state based on the platooning state information, and outputs the synchronized information on the image of the region ahead on the display.

In one implementation, the processor may calculate an image display delay time using a vehicle length of the leading vehicle, a vehicle speed, a distance between the vehicle and the leading vehicle, and a communication performance.

In one implementation, the processor may display the information on the image of the region ahead on the display when the image display delay time elapses after receiving the information on the image of the region ahead.

In one implementation, the leading vehicle may obtain location information of the leading vehicle when capturing the image of the region ahead, and insert the location information of the leading vehicle in the information on the image of the region ahead as an image capturing location.

In one implementation, the processor may display the information on the image of the region ahead on the display at a time point at which the vehicle location matches the image capturing location.

In one implementation, the leading vehicle may detect feature information of a front-side portion using at least one sensor when capturing the image of the region ahead, and insert the feature information of the front-side portion into the information on the image of the region ahead.

In one implementation, the processor may detect feature information of a front-side portion of the vehicle using at least one sensor to compare the feature information of the front-side portion of the vehicle with the feature information inserted into the information on the image of the region ahead, and outputs the information on the image of the region ahead on the display at a time point at which the two feature information match.

In one implementation, the processor may output the information on the image of the region ahead directly on the display when the platooning state is an unstable state.

According to another aspect of the present disclosure, a method for outputting platooning information of a device for controlling a vehicle includes receiving information on an image of a region ahead and platooning state information from a leading vehicle during platooning, determining a platooning state of the vehicle based on the platooning state information, synchronizing the information on the image of the region ahead with a vehicle location when the platooning state is a stable state, and outputting the synchronized information on the image of the region ahead on a display.

In one implementation, the synchronizing of information on the image of the region ahead with the vehicle location may include calculating an image display delay time using a vehicle length of the leading vehicle, a vehicle speed, a distance between the vehicle and the leading vehicle, and a communication performance.

In one implementation, the outputting of the synchronized information on the image of the region ahead on the display may include displaying the synchronized information on the image of the region ahead when the image display delay time elapses after receiving the information on the image of the region ahead.

In one implementation, the synchronizing of information on the image of the region ahead with the vehicle location may include monitoring the vehicle location in real time, and comparing and synchronizing the vehicle location with an image capturing location included in the information on the image of the region ahead.

In one implementation, the outputting of the synchronized information on the image of the region ahead on the display may include displaying the synchronized information on the image of the region ahead at a time point at which the vehicle location matches the image capturing location included in the information on the image of the region ahead.

In one implementation, the synchronizing of information on the image of the region ahead with the vehicle location may include detecting feature information of a front-side portion of the vehicle using at least one sensor, and comparing and synchronizing the detected feature information with feature information included in the information on the image of the region ahead.

In one implementation, the outputting of the synchronized information on the image of the region ahead on the display may include displaying the synchronized information on the image of the region ahead at a time point at which the detected feature information and the feature information included in the information on the image of the region ahead match.

In one implementation, the method may further include outputting the information on the image of the region ahead directly on the display when the platooning state is an unstable state.

DRAWINGS

The above and other objects, features and advantages of the present disclosure will be more apparent from the following detailed description taken in conjunction with the accompanying drawings.

DETAILED DESCRIPTION

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing some forms of the present disclosure, a detailed description of the related known configuration or function will be omitted when it is determined that it interferes with the understanding of some forms of the present disclosure.

In describing some forms of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that tams, such as those defined in commonly used dictionaries, should be interpreted as having a meaning that is consistent with their meaning in the context of the relevant art and will not be interpreted in an idealized or overly formal sense unless expressly so defined herein.

In the present specification, a foremost vehicle of a string of platooning vehicles is referred to as a leading vehicle LV, a vehicle following the leading vehicle LV is referred to as a following vehicle FV, a vehicle right in front of a vehicle is referred to as a preceding vehicle, and the leading vehicle LV and the following vehicle FV are collectively referred to as platooning vehicles.

The present disclosure relates to a technology in which the following vehicle outputs an image of a region ahead recorded by the leading vehicle during the platooning when a recording location of the image of the region ahead and a vehicle location are the same rather than outputs the image as it is to synchronize a behavior of the vehicle with a movement of the image.

Figure 1:
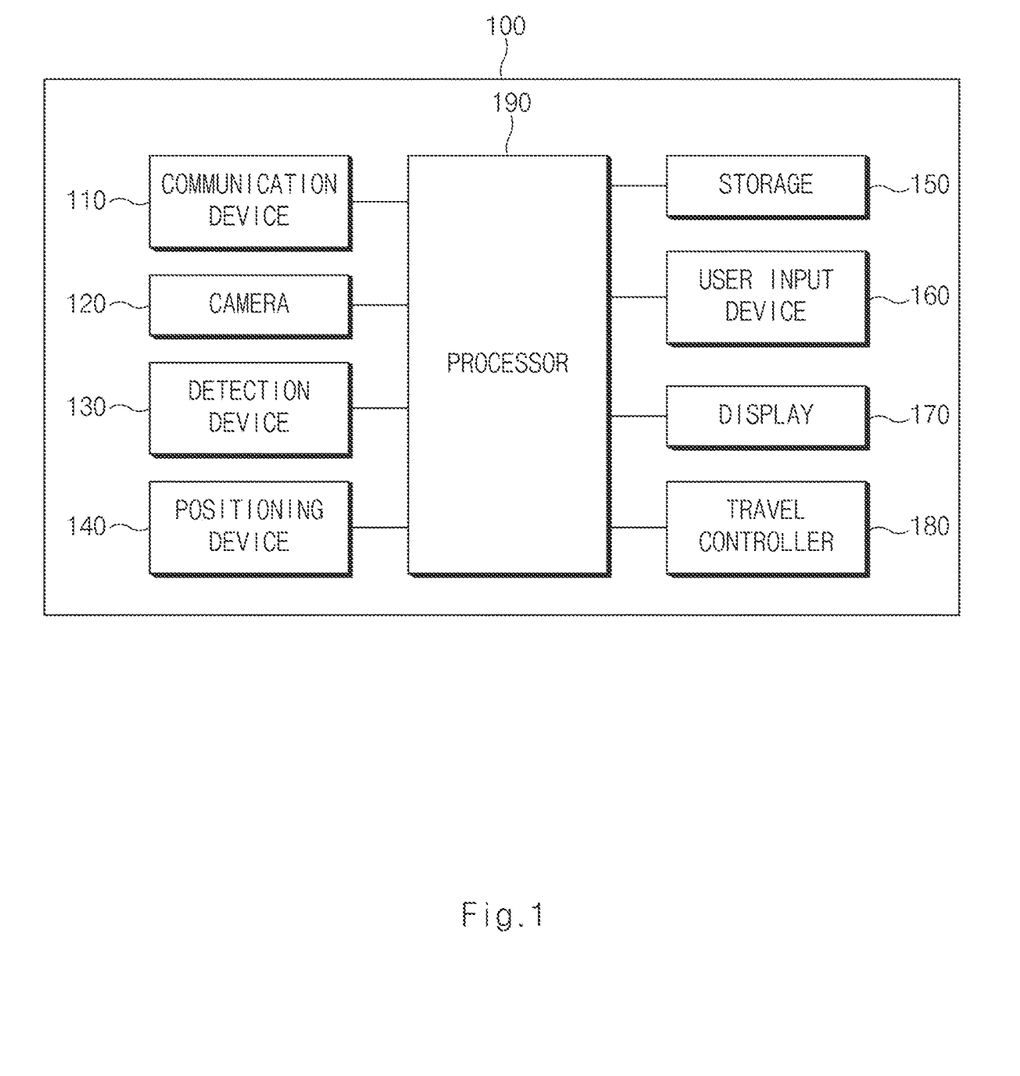
FIG. 1 is a block diagram illustrating a vehicle control device in one form of the present disclosure.

FIG. 1 is a block diagram illustrating a vehicle control device in some forms of the present disclosure.

Referring to FIG. 1, a vehicle control device 100 may be mounted on the vehicle to control the platooning. The vehicle control device 100 may be implemented as at least one electric control unit (ECU).

The vehicle control device 100 may include a communication device 110, a camera 120, a detection device 130, a positioning device 140, storage 150, a user input device 160, a display 170, a travel controller 180, and a processor 190.

The communication device 110 may support wireless communication between the vehicle and an external device (e.g., an ECU mounted on another vehicle in the platoon, a mobile terminal, a server, or the like). The communication device 110 may use a vehicle to everything (V2X) communication technology such as a vehicle to vehicle (V2V) communication and/or a vehicle to infrastructure (V2I) communication. For example, the communication device 110 may use at least one of communication technologies such as a wireless Internet (e.g., a Wi-Fi), a short-range communication (e.g., a Bluetooth, a ZigBee, and an infrared communication), a mobile communication, and/or the like to transmit and receive a V2V communication message.

The communication device 110 may support the vehicle control device 100 to communicate with the electric control units (ECUs) in the vehicle connected through an in-vehicle network (IVN). As an in-vehicle communication, a controller area network (CAN) communication, a media oriented systems transport (MOST) communication, a local interconnect network (LIN) communication, an X-by-Wire (a Flexray) communication, or the like may be used. The communication device 110 may include a communication processor, a communication circuit, an antenna, and/or a transceiver.

The camera 120 may be mounted on the vehicle to capture the image of the region ahead. The image of the region ahead may include at least one frame captured for a predetermined time. The camera 120 may include at least one of sensors such as a charge coupled device (CCD) image sensor, a complementary metal oxide semiconductor (CMOS) image sensor, a charge priming device (CPD) image sensor, and/or a charge injection device (CID) image sensor. The camera 120 may include at least one of lenses such as a standard lens, an ultra wide angle lens, a wide angle lens, a zoom lens, a macro lens, a telephoto lens, a fisheye lens, a semi-fisheye lens, and/or the like. The camera 120 may include an image processor for performing image processing such as noise elimination, color reproduction, file compression, image quality adjustment, saturation adjustment, and the like on an image acquired through the image sensor.

The detection device 130 may sense a front vehicle and obtain front vehicle information using sensors mounted on the vehicle. The detection device 130 may sense a behavior of the front vehicle using at least one of sensors such as an advanced driver assistance system (ADDS) sensor, a light detection and ranging (LiDAR), a radio detecting and ranging (RADAR), an image sensor, an ultrasonic sensor, and/or the like. The front vehicle information may include a speed, an acceleration, and/or a distance of the front vehicle.

The detection device 130 may use the sensors (e.g., a speed sensor, an acceleration sensor, and/or an inertial sensor) and/or other ECUs to detect state information, behavior information, and/or travel environment information of the vehicle.

The positioning device 140 may measure a current location of the vehicle. The positioning device 140 may measure the vehicle location using at least one of positioning technologies such as a global positioning system (GPS), a dead reckoning (DR), a differential GPS (DGPS), a carrier phase differential GPS (CDGPS), and/or the like. When using the GPS, the positioning device 140 may calculate the current location of the vehicle (the vehicle location) using triangulation.

The storage 150 may be a non-transitory storage medium that stores instructions executed by the processor 190. The storage 150 may store map information (map data), the front vehicle information, and the like, and may store the communication message received through the communication device 110. Further, the storage 150 may store the image of the region ahead captured by the camera 120. The storage 150 may be implemented as at least one of storage media (recording media) of a flash memory, a hard disk, a secure digital card (SD card), a random access memory (RAM), a static random access memory (SRAM), a read only memory (ROM), a programmable read only memory (PROM), an electrically erasable and programmable ROM (EEPROM), an erasable and programmable ROM (EPROM), a register, a removable disk, and/or web storage.

The user input device 160 may generate data resulted from a manipulation of a user. For example, the user input device 160 may generate data for turning on or off a platooning function in response to a user input. The user input device 160 may include at least one of input devices such as a button, a switch, a touch pad, and/or a touch screen. The input device is disposed on a steering wheel, a dashboard, a center fascia, and/or a door trim.

The display 170 may output a progress status and/or a result based on an operation of the processor 190. The display 170 may output (display) the image of the region ahead provided from the leading vehicle in response to an instruction of the processor 190. The display 170 may include at least one of a liquid crystal display (LCD), a thin film transistor-liquid crystal display (TFT-LCD), an organic light-emitting diode (OLED) display, a flexible display, a three-dimensional display (3D display), a transparent display, a head-up display (HUD), a touch screen, and/or a cluster.

The display 170 may include an audio output device such as a speaker capable of outputting audio data. For example, the display 170 may display start or end of the platooning, and may also output an audio signal through the speaker.

The travel controller 180, which controls steering, braking, suspension, and/or driving of the vehicle, may include a driving device (a power transmission device), a steering device, a suspension device, a braking device, and the like. The driving device, which controls the driving of the vehicle, may transmit power generated from a power source (e.g., an engine or a motor) to a wheel. The driving device may be implemented as a traction control system (TCS) and/or an all wheel drive system (AWD). The steering device may change a traveling direction of the vehicle during the travel. The steering device may be implemented as a four wheel steering system (4 WS), an electric power steering (EPS), an active front steering (AFS), and/or a steer by wire (SBW). The suspension device may reduce a vibration and a shock generated on a road surface by connecting a vehicle body and an axle with each other, and maintain a posture of the vehicle. The suspension device may be composed of a spring that mitigates the shock transmitted from the road surface, a damper that suppresses a free vibration, and a stabilizer bar that suppresses a roll movement to improve travel stability of the vehicle. In addition, the suspension device may actively change a height of the vehicle body as well as a damping force of the damper and rigidity of the stabilizer bar based on a travel environment. The braking device may decelerate or stop the vehicle. The braking device may monitor a vehicle state during the travel in real time and control the braking based on the vehicle state. The braking device may include an anti-lock braking system (ABS), an electronic stability control (ESC), and/or an electronic parking brake (EPB) system.

The processor 190 may control overall operations of the vehicle control device 100. The processor 190 may include at least one of an application specific integrated circuit (ASIC), a digital signal processor (DSP), a programmable logic device (PLD), a field programmable gate array (FPGA), a central processing unit (CPU), a microcontroller, and/or a microprocessor.

The processor 190 may form the platoon with at least one other vehicle through a join process for the platooning of the vehicle. Because the process of forming the platoon may be implemented using at least one of known technologies, a detailed description thereof will be omitted. The processor 190 may cause the vehicle to start the platooning when the platoon formation is completed.

When the vehicle is the leading vehicle in the platoon, the processor 190 may capture the image of the region ahead using the camera 120 mounted on the vehicle. The processor 190 may obtain the current location of the vehicle (the vehicle location) using the positioning device 140 when capturing the image of the region ahead. The processor 190 may insert or tag a vehicle location at an image capturing time point in the captured image of the region ahead. The processor 190 may insert the vehicle location of the capturing time point for each frame of the image of the region ahead when capturing the image of the region ahead.

In addition, the processor 190 may obtain feature information centering on a side portion of a screen of the camera 120 through the camera, the lidar, and/or the radar when capturing the image of the region ahead. The processor 190 may obtain feature information of a region peripheral to a location corresponding to a side portion of the image frame using the camera 120 and/or the detection device 130. The processor 190 may insert the feature information into the captured image frame. When obtaining the feature information, because a center of the screen of the camera 120 is covered by the front vehicle (the preceding vehicle), the feature information of the peripheral region centering on the side portion of the screen is obtained.

The processor 190 may determine whether an emergency situation has occurred in consideration of the vehicle state, the travel environment, and/or the will of the driver obtained by the detection device 130. The processor 190 may determine a platooning state as an unstable state when a risk of the emergency situation (e.g., sudden braking and/or a falling object ahead) occurred does not satisfy a platoon releasing condition but requires an active response. In addition, the processor 190 may determine the platooning state as an unstable state when a communication performance is within an allowable range, but is lowered by a value equal to or greater than a predetermined reference value. The processor 190 may determine the platooning state as a stable state when the communication performance is within the allowable range and no emergency situation has occurred. The allowable range, which is a communication performance range required to maintain the platooning, may be set in advance by a system designer.

The processor 190 may monitor a transmission performance of the communication device 110 in real time. The processor 190 may transmit (deliver) the image of the region ahead, platooning state information, and/or transmission performance information to the following vehicle. The image of the region ahead may include information on the vehicle location of the capturing time point and/or the feature information of the peripheral region.

The processor 190 may receive the image of the region ahead from the leading vehicle when the vehicle is the following vehicle in the platoon. When receiving the image of the region ahead, the processor 190 may receive a leading vehicle location at the time point at which the image of the region ahead is captured, the platooning state information, and/or the transmission performance information together. The processor 190 may monitor a reception performance of the communication device 110 in real time when receiving the image of the region ahead.

The processor 190 may obtain vehicle location information (following vehicle location information) through the detection device 130 and/or the positioning device 140.

When the platooning state is stable, the processor 190 may synchronize the image of the region ahead to a following vehicle location based on preceding vehicle location information included in the image of the region ahead. The processor 190 may output (display) the synchronized image of the region ahead on the display 170. In addition, the processor 190 may also display the platooning state information.

When the platooning state is unstable, the processor 190 may output the received image on the display 170 without performing the synchronization processing for the received image of the region ahead. The processor 190 may also output a warning sound and/or a warning message indicating the emergency situation.

Figure 2:
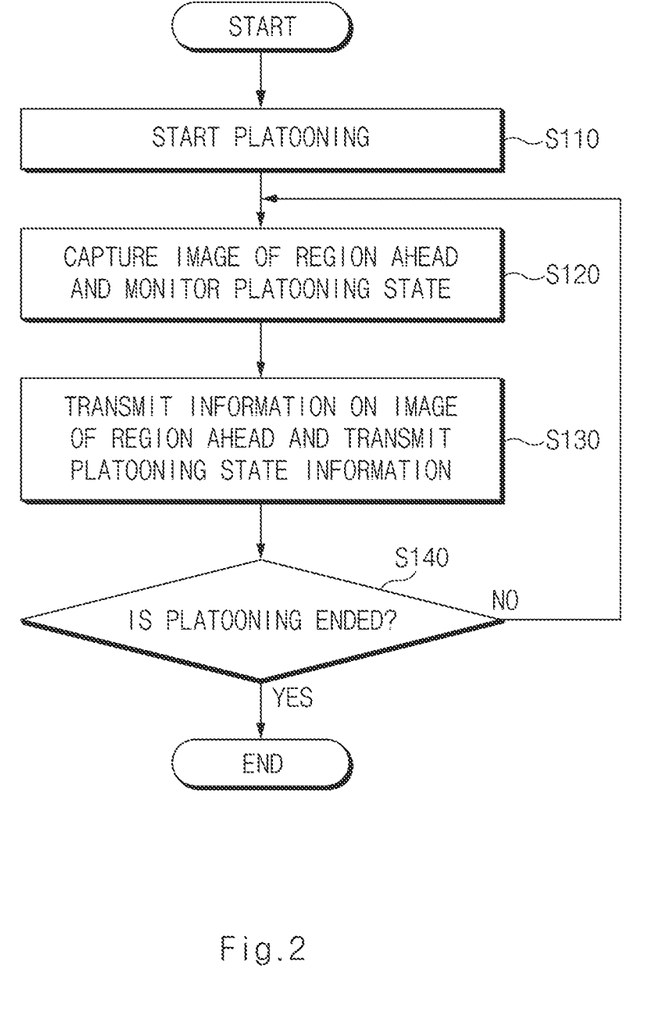
FIG. 2 is a flowchart illustrating an operation process of a leading vehicle in one form of the present disclosure.

FIG. 2 is a flowchart illustrating an operation process of a leading vehicle in some forms of the present disclosure.

When the platoon formation is completed, the leading vehicle may start the platooning (S110).

When the platooning starts, the leading vehicle may monitor the platooning state using the camera 120 and/or the detection device 130 while capturing the image of the region ahead using the camera 120 (S120). The leading vehicle may detect the leading vehicle location of the image capturing time point using the positioning device 140 when capturing the image of the region ahead. The leading vehicle may insert the leading vehicle location into the captured image of the region ahead.

The leading vehicle may transmit information on the image of the region ahead and the platooning state information to the following vehicle (S130). The leading vehicle may check the transmission performance of the communication device 110 and transmit the transmission performance together with the information on the image of the region ahead and the platooning state information.

The leading vehicle may determine whether the platooning is ended after transmitting the information on the image of the region ahead and the platooning state information to the following vehicle (S140). The leading vehicle may continuously capture the image of the region ahead until the platooning is ended and transmit the image of the region ahead to the following vehicle along with the platooning state information.

Figure 3:
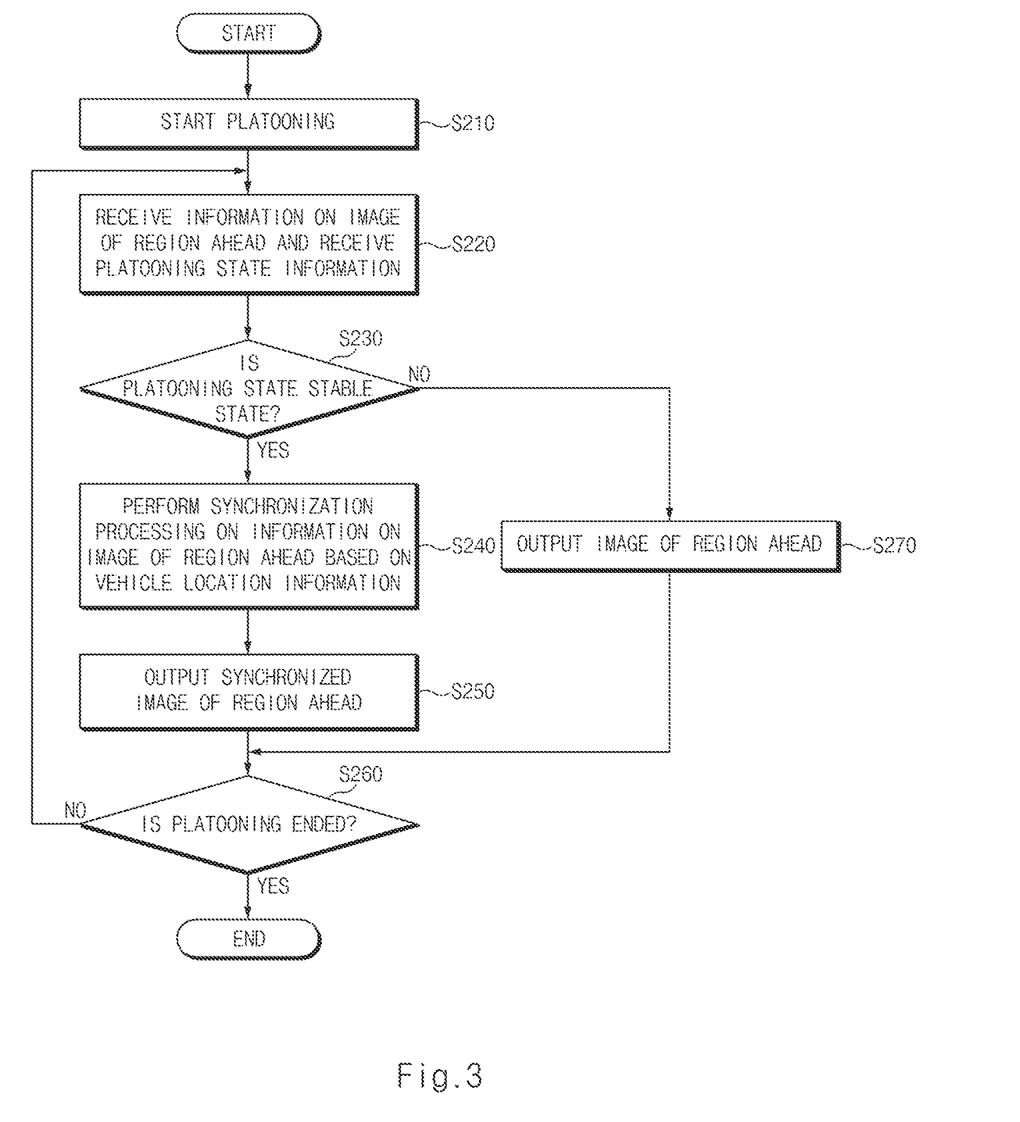
FIG. 3 is a flowchart illustrating an operation process of a following vehicle in one form of the present disclosure.

FIG. 3 is a flowchart illustrating an operation process of a following vehicle in some forms of the present disclosure.

The following vehicle may start the platooning together with the leading vehicle after the platoon formation (S210).

The following vehicle may receive the information on the image of the region ahead and the platooning state information from the leading vehicle (S220). The processor 190 of the following vehicle may receive the information on the image of the region ahead and the platooning state information transmitted from the leading vehicle through the communication device 110. The processor 190 may monitor the reception performance of the communication device 110 in real time.

The following vehicle may determine whether the platooning state is the stable state based on the platooning state information (S230).

When the platooning state is the stable state, the following vehicle may perform the synchronization processing on the information on the image of the region ahead based on the vehicle location information (S240). The processor 190 may perform the synchronization processing on the image of the region ahead such that the image of the region ahead is able to be displayed by the following vehicle at a time point at which the following vehicle location measured by the positioning device 140 and a capturing time point location included in the information on the image of the region ahead, that is, a preceding vehicle location match.

The following vehicle may output the synchronized image of the region ahead on the display 170 (S250). The processor 190 may display the image of the region ahead on the display 170 when the following vehicle location and the capturing time point location of the image of the region ahead match.

The following vehicle may determine whether the platooning is ended while outputting the synchronized image of the region ahead (S260). The following vehicle may repeatedly perform the operations after S220 until the platooning is ended.

When the platooning state is not the stable state in S230, the following vehicle may immediately output the received image of the region ahead on the display 170 without the synchronization processing (S270). When the platooning state is identified as the unstable state, the processor 190 outputs the image of the region ahead provided from the leading vehicle as it is on the display 170, so that the user of the following vehicle is able to identify the image of the region ahead.

Figure 4:
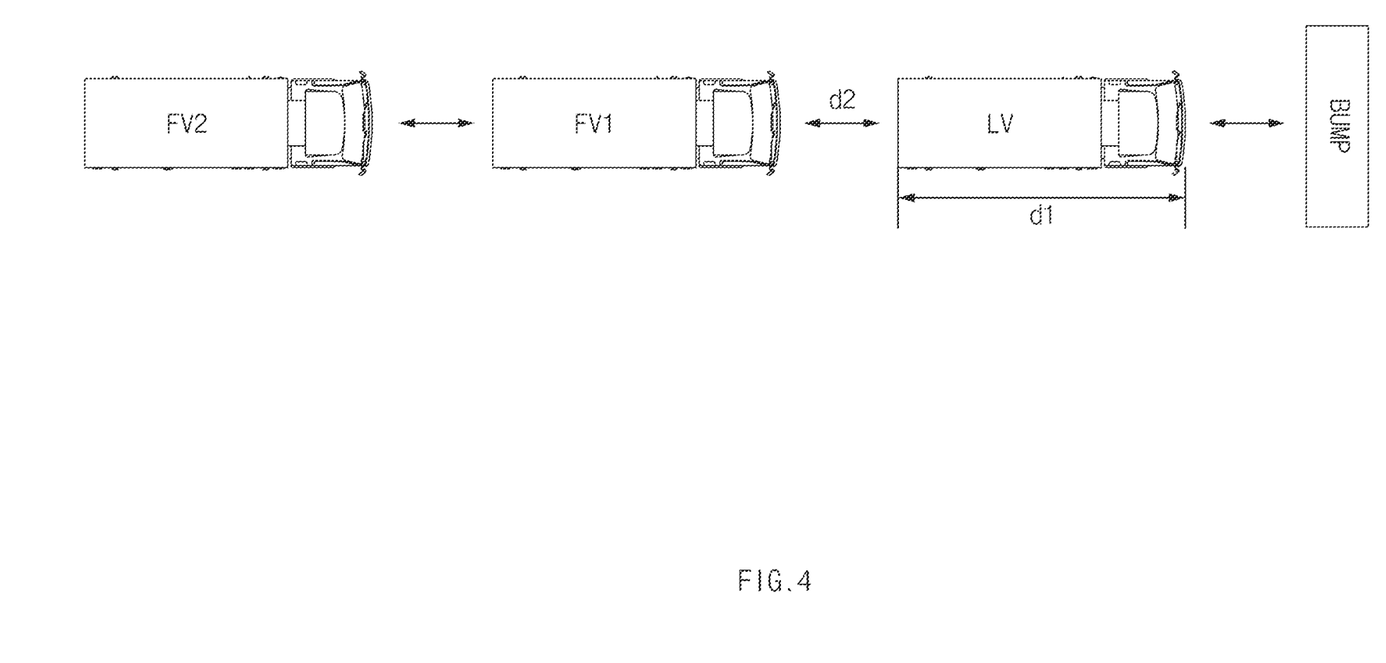
FIG. 4 is a diagram for illustrating a synchronizing method in one form of the present disclosure.

FIG. 4 is a diagram for illustrating a synchronizing method in some forms of the present disclosure.

As shown in FIG. 4, in a situation in which a following vehicle FV1 is platooning along the leading vehicle LV, the image of the region ahead must be played after the following vehicle FV1 moves by a distance of a sum of a length d1 of the leading vehicle LV and a distance d2 between the leading vehicle LV and the following vehicle FV1 to allow the image of the region ahead displayed on the following vehicle FV1 to show the same behavior at the same angle of view as on the leading vehicle LV. To this end, the capturing time point location of the image of the region ahead and a location of the following vehicle FV1 may be synchronized with each other. As a synchronization processing method, a method using the sensor, a method using the GPS, and/or a method using the feature information as follows may be used.

Synchronization Method Using Sensor

The leading vehicle LV may transmit the captured image of the region ahead to the following vehicle FV1. The following vehicle FV1 may measure an inter-vehicle distance with the leading vehicle LV using the sensor at a time point at which the image of the region ahead is received. The following vehicle FV1 may calculate the capturing time location of the image of the region ahead (a longitudinal location) by adding a vehicle length of the leading vehicle LV to the inter-vehicle distance based on internal logic and taking into account a communication delay (a transmission delay and/or a reception delay). The image of the region ahead may be output on the display 170 when the following vehicle FV1 reaches the capturing time point location by calculating a moved distance of the vehicle using a vehicle speed of the following vehicle FV1.

For example, when the vehicle length of the leading vehicle LV is 15 m, the distance between the leading vehicle LV and the following vehicle FV1 is 15 m, the communication delay and the speed of the following vehicle FV1 are 20 ms and 20 mps, respectively, the following vehicle FV1 may calculate a display delay time of the image of the region ahead of 1.48 seconds (=(15+15)/20−0.02). That is, the following vehicle FV1 displays the image of the region ahead after the delay of 1.48 seconds after receiving the image of the region ahead from the leading vehicle LV, so that the capturing location of the image of the region ahead and the location of the following vehicle FV1 may be synchronized with each other.

Synchronization Method Using GPS

The leading vehicle LV may obtain leading vehicle location information of the image capturing time point (the capturing time point location) using the GPS when capturing the image of the region ahead and insert the leading vehicle location information of the image capturing time point into the image frame. The leading vehicle LV may transmit the image of the region ahead including the capturing time point location (an image capturing location) information to following vehicles FV1 and FV2. When receiving the image of the region ahead provided from the leading vehicle LV, the following vehicle FV1 or FV2 compares a current location thereof being tracked in real time with the image capturing location included in the image of the region ahead. The following vehicle FV1 or FV2 may display the image of the region ahead at a time point at which the two locations match.

Synchronization Method Using Feature Information

The leading vehicle LV may detect feature information of a peripheral region centering on a front-side portion using the sensors such as the camera and/or the lidar when capturing the image of the region ahead, insert the feature information of the peripheral region of the front-side portion into the image frame, and then transmit the frame to the following vehicle FV1 or FV2. The following vehicle FV1 or FV2 may detect the feature information of the peripheral region of the front-side portion using the sensors such as the camera and/or the lidar, compare the feature information of the peripheral region of the front-side portion with the feature information of the peripheral region included in the image of the region ahead, and display the image of the region ahead at a time point at which the feature information of the two peripheral regions match.

Figure 5:
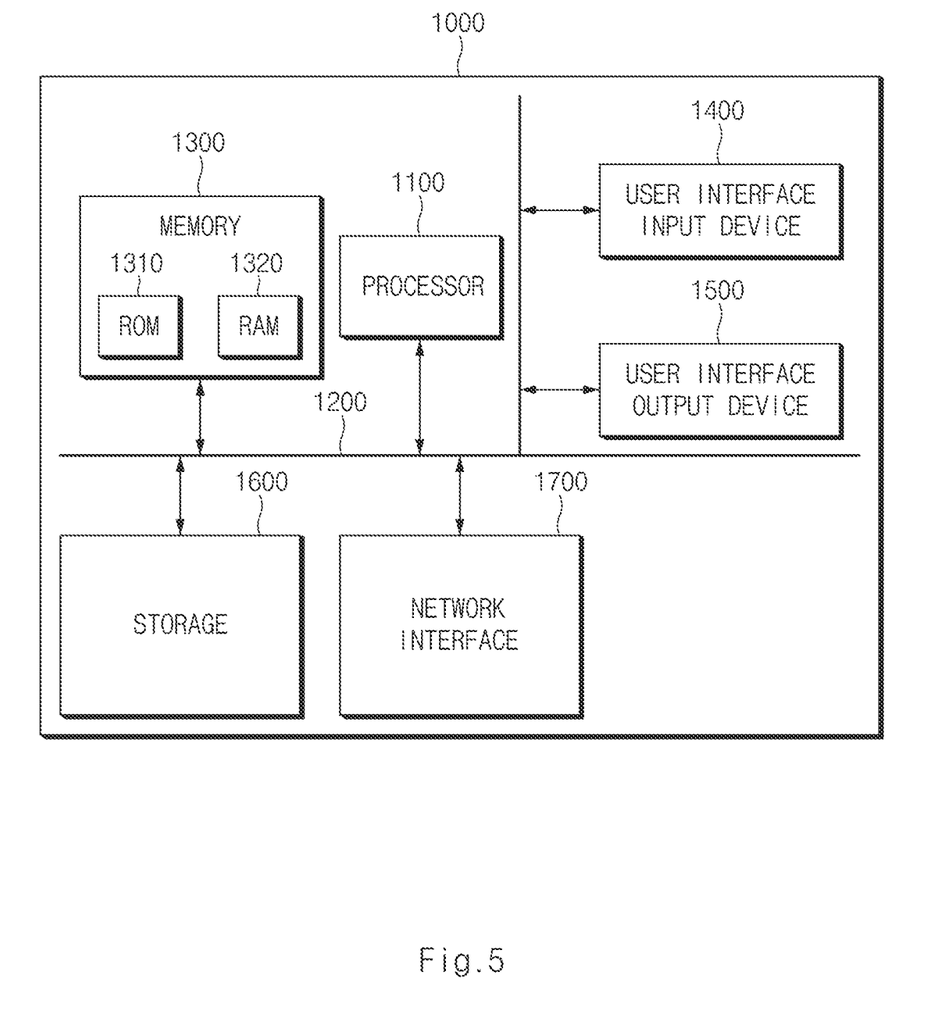
FIG. 5 is a block diagram illustrating a computing system that executes a method for displaying platooning information of a vehicle control device in one form of the present disclosure.

FIG. 5 is a block diagram illustrating a computing system that executes a method for displaying platooning information of a vehicle control device in some forms of the present disclosure.

Referring to FIG. 5, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in some forms of the present disclosure may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary forms of the present disclosure are provided to explain the spirit and scope of the present disclosure, but not to limit them, so that the spirit and scope of the present disclosure is not limited by the forms of the present disclosure. The scope of the present disclosure should be construed on the basis of the accompanying claims, and all the technical ideas within the scope equivalent to the claims should be included in the scope of the present disclosure.

According to the present disclosure, the image of the region ahead provided from the leading vehicle is received during the platooning and displayed in synchronization with the vehicle location, so that the cognitive dissonance felt by the user of the following vehicle may be reduced.

In addition, according to the present disclosure, the image of the region ahead of the leading vehicle is captured during the platooning and shared with the following vehicle, so that the user (the driver) of the following vehicle may predict and prepare for the behavior of the vehicle through the shared image of the region ahead.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for controlling a following vehicle, the device comprising:
   a display;
   a communication device; and
   a processor connected to the display and the communication device,
   wherein the processor is configured to:
     receive information on an image of a region ahead and platooning state information from a leading vehicle through the communication device during platooning;
     synchronize the information on the image of the region ahead with a vehicle location when a platooning state is a stable state based on the platooning state information; and
     output the synchronized information on the image of the region ahead on the display,
   wherein the leading vehicle is configured to determine the platooning state as the stable state when the communication performance is within the allowable range and no emergency situation has occurred, and
   wherein the processor is further configured to output the information on the image of the region ahead directly on the display when the platooning state is not the stable state.

2. The device of claim 1, wherein the processor is configured to:
   calculate an image display delay time using a vehicle length of the leading vehicle, a vehicle speed, a distance between the following vehicle and the leading vehicle, and the communication performance.

3. The device of claim 2, wherein the processor is configured to:
   display the information on the image of the region ahead on the display when the image display delay time elapses after receiving the information on the image of the region ahead.

4. The device of claim 1, wherein the leading vehicle is configured to:
   obtain location information of the leading vehicle when capturing the image of the region ahead; and
   insert the location information of the leading vehicle into the information on the image of the region ahead as an image capturing location.

5. The device of claim 4, wherein the processor is configured to:
   display the information on the image of the region ahead on the display when the vehicle location matches the image capturing location.

6. The device of claim 1, wherein the leading vehicle is configured to:
   detect feature information of a front-side portion using at least one sensor when capturing the image of the region ahead; and
   insert the feature information of the front-side portion into the information on the image of the region ahead.

7. The device of claim 6, wherein the processor is configured to:
   detect the feature information of the front-side portion of the following vehicle using the at least one sensor to compare the feature information of the front-side portion of the following vehicle with the feature information inserted into the information on the image of the region ahead; and
   output the information on the image of the region ahead on the display when the feature information matches the inserted feature information.

8. A method for outputting platooning information of a device for controlling a following vehicle, the method comprising:
   receiving, by a processor, information on an image of a region ahead and platooning state information from a leading vehicle during platooning;
   determining, by the processor, a platooning state based on the platooning state information;
   synchronizing, by the processor, the information on the image of the region ahead with a vehicle location when the platooning state is a stable state;
   outputting, by the processor, the synchronized information on the image of the region ahead on a display,
     wherein the determining the platooning state includes determining, by the following vehicle, the platooning state as a stable state when the communication performances is within the allowable range and no emergency situation has occurred,
   wherein the method further comprises:
     outputting, by the processor, the information on the image of the region ahead directly on the display when the platooning state is not the stable state.

9. The method of claim 8, wherein the synchronizing of information on the image of the region ahead with the vehicle location includes:
   calculating an image display delay time using a vehicle length of the leading vehicle, a vehicle speed, a distance between the following vehicle and the leading vehicle, and the communication performance.

10. The method of claim 9, wherein the outputting of the synchronized information on the image of the region ahead on the display includes:
    displaying the synchronized information on the image of the region ahead when the image display delay time elapses after receiving the information on the image of the region ahead.

11. The method of claim 8, wherein the synchronizing of information on the image of the region ahead with the vehicle location includes:
    monitoring the vehicle location in real time; and
    comparing and synchronizing the vehicle location with an image capturing location included in the information on the image of the region ahead.

12. The method of claim 11, wherein the outputting of the synchronized information on the image of the region ahead on the display includes:

displaying the synchronized information on the image of the region ahead when the vehicle location matches the image capturing location included in the information on the image of the region ahead.

13. The method of claim 8, wherein the synchronizing of information on the image of the region ahead with the vehicle location includes:
   detecting feature information of a front-side portion of the following vehicle using at least one sensor; and
   comparing and synchronizing the detected feature information with feature information included in the information on the image of the region ahead.

14. The method of claim 13, wherein the outputting of the synchronized information on the image of the region ahead on the display includes:
   displaying the synchronized information on the image of the region ahead when the detected feature information matches the feature information included in the information on the image of the region ahead.

* * * * *